United States Patent
Jiang et al.

(10) Patent No.: US 10,268,833 B2
(45) Date of Patent: Apr. 23, 2019

(54) METHOD FOR CONDITIONAL PERMISSION CONTROL IN A DIGITAL DATA SHEET BASED ON A FORMULA

(71) Applicant: International Business Machines Corporation, Armonk, NY (US)

(72) Inventors: Bo Jiang, Beijing (CN); Ming Zhe Jiang, Beijing (CN); Zi Ying Li, Beijing (CN); Hua Shao, Beijing (CN); Dong Jun Zong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 15/092,742

(22) Filed: Apr. 7, 2016

(65) Prior Publication Data

US 2017/0293770 A1 Oct. 12, 2017

(51) Int. Cl.
*G06F 21/62* (2013.01)

(52) U.S. Cl.
CPC .............................. *G06F 21/6227* (2013.01)

(58) Field of Classification Search
CPC ............................................... G06F 21/6227
See application file for complete search history.

(56) References Cited

U.S. PATENT DOCUMENTS

| | | | |
|---|---|---|---|
| 6,988,241 B1 * | 1/2006 | Guttman | G06F 17/246 707/E17.115 |
| 7,389,473 B1 | 6/2008 | Sawicki et al. | |
| 7,647,551 B2 * | 1/2010 | Vigesaa | G06F 17/211 709/203 |
| 7,904,800 B2 * | 3/2011 | Geuss | G06F 17/2264 707/705 |
| 7,930,316 B2 | 4/2011 | Muller et al. | |
| 7,970,790 B2 | 6/2011 | Yang et al. | |
| 8,286,072 B2 * | 10/2012 | Chamberlain | G06F 17/212 715/215 |
| 8,307,119 B2 * | 11/2012 | Rochelle | G06F 17/246 709/201 |
| 8,713,422 B2 | 4/2014 | Chamberlain et al. | |
| 9,514,249 B2 * | 12/2016 | Ge | G06F 17/30961 |
| 9,626,393 B2 * | 4/2017 | Gould | G06F 17/30303 |
| 9,928,241 B2 * | 3/2018 | Frei | G06Q 90/00 |
| 2002/0138316 A1 * | 9/2002 | Katz | G06Q 10/06311 705/7.13 |
| 2002/0161799 A1 * | 10/2002 | Maguire, III | G06F 17/246 715/212 |
| 2002/0174000 A1 * | 11/2002 | Katz | G06Q 10/06316 705/7.26 |

(Continued)

OTHER PUBLICATIONS

Long, Jacob; "[Update: New APK adds Support for one Feature] Google Sheets Now Allows Cell-Level Permission Contorl!, Warning Pop-Ups Before Changing Important Data, Data Levels in Charts, and More"; Printed Feb. 12, 2016; pp. 6; <http://www.androidpolice.com/2015/06/15/google-sheets-now-allows . . . >.

*Primary Examiner* — Sharon S Lynch
(74) *Attorney, Agent, or Firm* — Edward P. Li

(57) ABSTRACT

A method, a computer program product, and a computer system for conditional permission control in a digital data sheet based on permission formulas. A computer checks permission formulas of data cells in the data sheet, in response that a user opens the data sheet. The computer sets cell permissions for the data cells based on the permission formulas. The computer rechecks the cell permissions, in response to that the user edits one or more of the data cells. The computer resets the cell permissions based on the permission formulas.

15 Claims, 5 Drawing Sheets

(56) References Cited

U.S. PATENT DOCUMENTS

| | | | |
|---|---|---|---|
| 2002/0178077 A1* | 11/2002 | Katz | G06Q 10/0637 |
| | | | 705/7.36 |
| 2003/0033179 A1* | 2/2003 | Katz | G06Q 10/063 |
| | | | 705/7.12 |
| 2004/0215494 A1* | 10/2004 | Wahlbin | G06Q 40/02 |
| | | | 705/4 |
| 2005/0114672 A1 | 5/2005 | Duncan et al. | |
| 2006/0015805 A1* | 1/2006 | Humenansky | G06F 17/246 |
| | | | 715/209 |
| 2006/0129913 A1* | 6/2006 | Vigesaa | G06F 17/211 |
| | | | 715/250 |
| 2007/0233811 A1* | 10/2007 | Rochelle | G06F 17/246 |
| | | | 709/219 |
| 2008/0188970 A1* | 8/2008 | Huang | G06N 5/022 |
| | | | 700/103 |
| 2009/0235087 A1* | 9/2009 | Bird | G06F 21/10 |
| | | | 713/190 |
| 2010/0042913 A1* | 2/2010 | Chamberlain | G06F 17/212 |
| | | | 715/215 |
| 2010/0325173 A1* | 12/2010 | Haley | G06F 17/30604 |
| | | | 707/804 |
| 2013/0013994 A1* | 1/2013 | Handsaker | G06F 17/246 |
| | | | 715/217 |
| 2015/0033131 A1 | 1/2015 | Peev et al. | |
| 2015/0200945 A1* | 7/2015 | Edson | G06F 21/62 |
| | | | 726/28 |
| 2016/0173541 A1* | 6/2016 | Gusain | H04L 65/403 |
| | | | 715/212 |
| 2017/0185592 A1* | 6/2017 | Frei | G06Q 90/00 |
| 2017/0200122 A1* | 7/2017 | Edson | G06Q 10/101 |

\* cited by examiner

| C2 | | Data Formulas | | 123 |
|---|---|---|---|---|
| Show Permission | ☐ | Permission Formulas | | =editable(B2) |

| | A | B | C | D |
|---|---|---|---|---|
| 1 | | | | |
| 2 | | Peter | 123 | |
| 3 | | Wang | | |
| 4 | | Lily | | |
| 5 | | Alice | | |
| 6 | | Jone | | |

FIG. 3

| C2 | | Data Formulas | | 123 |
|---|---|---|---|---|
| Show Permission | ☑ | Permission Formulas | | =editable(B2) |

| | A | B | C | D |
|---|---|---|---|---|
| 1 | | | | |
| 2 | | =editable(ADMIN) | =editable(B2) | |
| 3 | | =editable(ADMIN) | | |
| 4 | | =editable(ADMIN) | | |
| 5 | | =editable(ADMIN) | | |
| 6 | | =editable(ADMIN) | | |
| 7 | | =editable(ADMIN) | | |

FIG. 4

| C2 | | Data Formulas | | 123 |
|---|---|---|---|---|
| | | Permission Formulas | | |
| | A | B | C | D |
| 1 | | | | |
| 2 | | Peter | 123 | |
| 3 | | Wang | | |
| 4 | | Lily | | |
| 5 | | Alice | | |
| 6 | | Jone | | |

METHOD FOR CONDITIONAL PERMISSION CONTROL IN A DIGITAL DATA SHEET BASED ON A FORMULA

BACKGROUND

The present invention relates generally to a digital data sheet application, and more particularly to conditional permission control in a digital data sheet based on a permission formula.

In a digital data sheet application, there is a common requirement to add permission control for setting data range or cells with different permission (such as read-only and editable) for different users. Therefore, some cells are read-only for some users while some are editable for some other users. Such requirement is especially strong in an online collaborative editing application or for the case in which people use a data sheet as a workflow tool.

Known solutions link information of users or roles to cells, to achieve the objective to grant with permissions. First, these solutions are very inefficient. If many cell ranges need to be assigned with permissions to different users, the workload will be huge. Second, the permissions are static. The permissions are not related to other conditional rules, such as data content, date/time, etc. Therefore, the permission control is not convenient and lack of flexibility.

SUMMARY

In one aspect, a method for conditional permission control in a digital data sheet based on permission formulas is provided. The method includes checking, by a computer, permission formulas of data cells in the data sheet, in response that a user opens the data sheet. The method further includes setting, by the computer, cell permissions for the data cells, based on the permission formulas. The method further includes rechecking, by the computer, the cell permissions, in response to that the user edits one or more of the data cells. The method further includes resetting, by the computer, the cell permissions, based on the permission formulas.

In another aspect, a computer program product for conditional permission control in a digital data sheet based on permission formulas is provided. The computer program product comprises a computer readable storage medium having program code embodied therewith. The program code is executable to check, by a computer, permission formulas of data cells in the data sheet, in response that a user opens the data sheet. The program code is executable to set, by the computer, cell permissions for the data cells, based on the permission formulas. The program code is executable to recheck, by the computer, the cell permissions, in response to that the user edits one or more of the data cells. The program code is executable to reset, by the computer, the cell permissions, based on the permission formulas.

In yet another aspect, a computer system for conditional permission control in a data sheet based on permission formulas is provided. The computer system comprises one or more processors, one or more computer readable tangible storage devices, and program instructions stored on at least one of the one or more computer readable tangible storage devices for execution by at least one of the one or more processors. The program instructions are executable to check, by a computer, permission formulas of data cells in the data sheet, in response that a user opens the data sheet. The program instructions are executable to set, by the computer, cell permissions for the data cells, based on the permission formulas. The program instructions are executable to recheck, by the computer, the cell permissions, in response to that the user edits one or more of the data cells. The program instructions are executable to reset, by the computer, the cell permissions, based on the permission formulas.

BRIEF DESCRIPTION OF THE SEVERAL VIEWS OF THE DRAWINGS

FIG. 3 is a diagram illustrating a digital data sheet with permission formulas for conditional permission control, in accordance with one embodiment of the present invention.

FIG. 4 is a diagram illustrating a digital data sheet showing permission formulas in data cells, in accordance with one embodiment of the present invention.

DETAILED DESCRIPTION

Embodiments of the present invention use formula rules to dynamically calculate permission of data cells in runtime. The data source of the formula rules may come from, for example, cell content, date/time, web service data, or from other permission formula. Embodiments of the present invention propose following solutions. (1) A data cell has additional permission information properties and a digital data sheet has a capability of calculating permission. (2) A permission formula comprises a formula name and mathematical variables or logical variables, and the permission formula is used to calculate cell permission and results in a cell with a property value of permission. The computer system can recognize the property value of the cell and implement the access control accordingly. The permission formula inherits same characters as common formulas that can refer to other data range; therefore, an administrator or data sheet owner can manipulate the permission formula as a common formula, and the permission formulas on different cell ranges are capable of being copied, pasted, or dragged in a digital data sheet. (3) A computer system can provide an administrator or data sheet owner with an interface for editing and rendering a permission formula associated with a data cell. (4) The permission setting is dynamically generated in runtime. The permission can be changed accordingly if any variable reference is changed. The permission setting is dynamic and easy.

Figure 1:
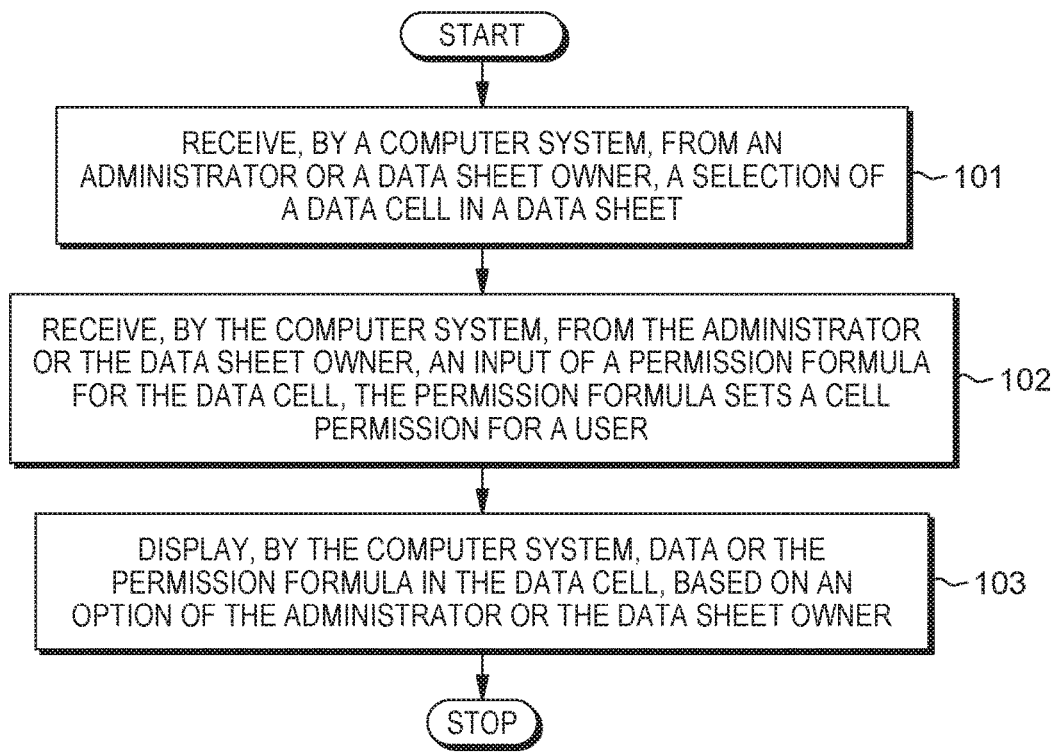
FIG. 1 is a flowchart illustrating operational steps of receiving and displaying a permission formula for a selected data cell in a digital data sheet, in accordance with one embodiment of the present invention.

FIG. 1 is a flowchart illustrating operational steps of receiving and displaying a permission formula for a selected data cell in a digital data sheet, in accordance with one embodiment of the present invention. At step 101, a computer system receives, from an administrator or a data sheet owner, a selection of a data cell in a data sheet. At step 102, the computer system receives form the administrator or the data sheet owner an input of a permission formula for the data cell which is selected at step 101. The permission formula sets cell permission for a user. For example, digital data sheet 300 in FIG. 3, the administrator or the data sheet owner selects cell C2 (column C and row 2), which has a data value of 123. The administrator or the data sheet owner sets a permission formula: =editable (B2); the permission formula sets cell C2 editable for cell B2 (column B and row 2) whose date value is a user ID (Peter). The formula is capable of being copied/pasted or auto-filled to set other cells with permissions. The administrator or the data sheet owner may add more complex conditional rules to define the permission, such as date/time and summary of a data range. For example, the formula may be defined as "=editable (user=B2 and date=Saturday)".

Figure 5:
FIG. 5 is a diagram illustrating a digital data sheet without showing permission formulas in data cells, in accordance with one embodiment of the present invention.

At step 103, the computer system displays, based on an option of the administrator or the data sheet owner, the data value or the permission formula in the data cell. If the administrator or the data sheet owner chooses to show permission formulas in data cells, the computers system displays permission formulas in data cells. For example, digital data sheet 400 in FIG. 4, the computer system displays the permission formula for cell C2: =editable(B2) and permission formulas for cells in column B which contains user IDs. If the administrator or the data sheet owner does not choose to show the permission formulas in data cells, the computer system displays normal data content values in data cells by default. For example, digital data sheet 500 in FIG. 5, the computer system displays the data value for cell C2: 123 and data values in column B.

Figure 2:
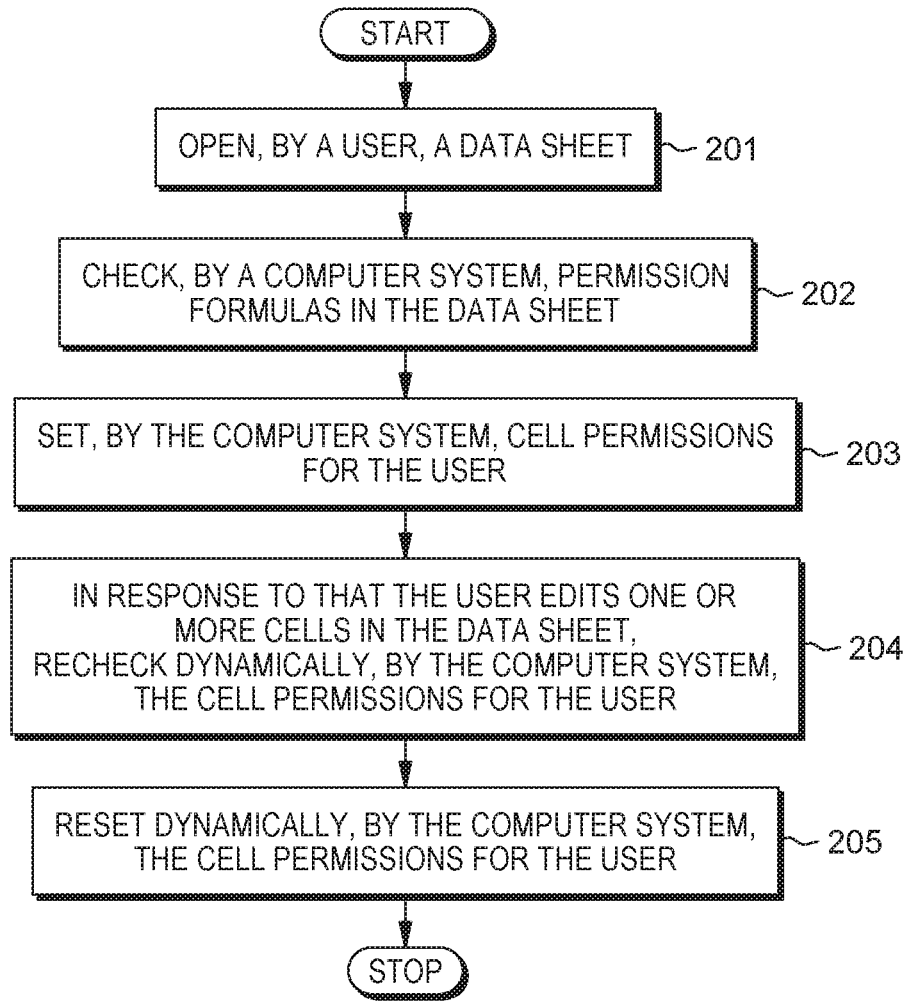
FIG. 2 is a flowchart illustrating operational steps of dynamic conditional permission control in a digital data sheet based on permission formulas, in accordance with one embodiment of the present invention.

FIG. 2 is a flowchart illustrating operational steps of dynamic conditional permission control in a digital data sheet based on permission formulas, in accordance with one embodiment of the present invention. At step 201, a user opens a data sheet. At step 202, a computer system checks permission formulas in the data sheet opened at step 201. At step 203, the computer system sets the cell permissions for the user. At step 204, the computer rechecks dynamically the cell permissions for the user, in response to that the user edits one or more cells in the data sheet. At step 205, the computer system resets dynamically the cell permissions for the user. Every time when the data sheet is opened or related conditional rules such as data content and date/time is changed, the cell permissions will be re-computed.

There are many solutions to define who can set the cell permissions in a data sheet. For example, a user who has an administrator role is assigned to set cell permissions while others can not set the cell permissions; the authority of setting the cell permissions may be delegated. Alternatively, all users in the group working on the data sheet may set the cell permissions.

Figure 6:
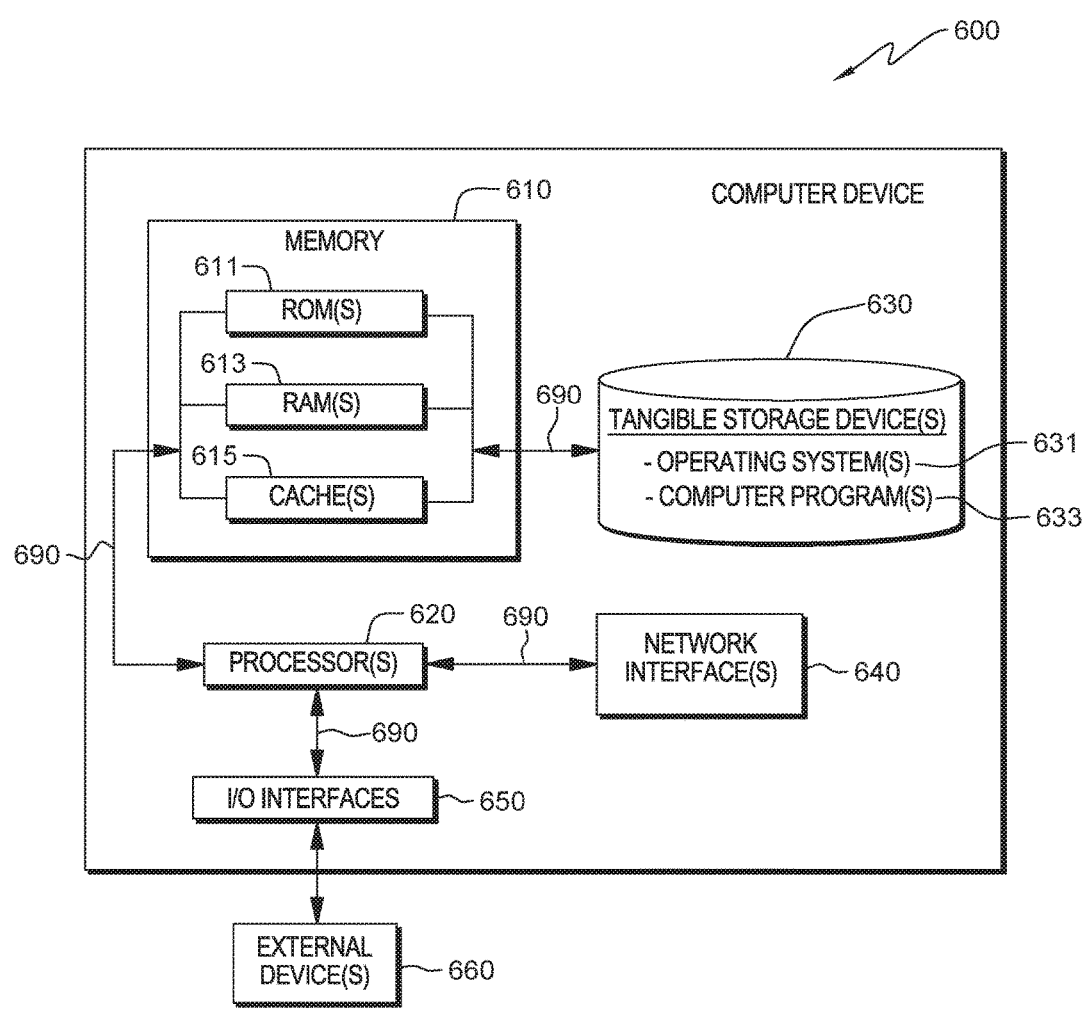
FIG. 6 is a diagram illustrating components of a computer device hosting one or more computer programs for conditional permission control in a digital data sheet based on permission formulas, in accordance with one embodiment of the present invention.

FIG. 6 is a diagram illustrating components of a computer device hosting one or more computer programs for conditional permission control in a digital data sheet based on permission formulas, in accordance with one embodiment of the present invention. It should be appreciated that FIG. 6 provides only an illustration of one implementation and does not imply any limitations with regard to the environment in which different embodiments may be implemented.

Referring to FIG. 6, computer device 600 includes processor(s) 620, memory 610, and tangible storage device(s) 630. In FIG. 6, communications among the above-mentioned components of computer device 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630. One or more computer programs 633 include one or more computer programs for conditional permission control in a digital data sheet based on permission formulas. Computer device 600 further includes I/O interface(s) 650. I/O interface(s) 650 allows for input and output of data with external device(s) 660 that may be connected to computer device 600. Computer device 600 further includes network interface(s) 640 for communications between computer device 600 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for conditional permission control in a digital data sheet based on permission formulas, the method comprising:
    checking, by a computer, permission formulas of data cells in the data sheet, in response to a user opening the data sheet, the permission formulas being input by an administrator of the datasheet, the permission formulas including conditional rules which define permissions of respective users to respective ones of the data cells;
    setting, by the computer, cell permissions for the data cells, based on the permission formulas, wherein cell permissions of one or more other data cells in the data sheet are set by performing the following operations to each permission formula, which is from the permission formulas, of a data cell from the data cells: copying, pasting, dragging and auto-filling;
    rechecking, by the computer, the cell permissions, in response to the user editing one or more of the data cells; and
    resetting, by the computer, the cell permissions at runtime, based on the permission formulas, in response to a respective one of the conditional rules being changed by the user editing the one or more data cells.

2. The method of claim 1, further comprising:
    receiving, by the computer, a selection of a data cell from the data cells in the data sheet, from the administrator of the data sheet; and
    receiving, by the computer, an input of one permission formula from the permission formulas for the data cell, from the administrator.

3. The method of claim 1, further comprising:
    displaying, by the computer, the permission formulas in the data cells, in response to the administrator of the data sheet choosing to show the permission formulas in the data cells.

4. The method of claim 1, wherein each permission formula of a data cell, which is from the permission formulas, comprises one or more of a formula name, mathematical variables, and logical variables, wherein each permission formula of a data cell refers to the one or more other data cells.

5. The method of claim 1, wherein each permission formula of a data cell, which is from the permission formulas, is calculated by the computer and results in a data cell from the data cells having a property value of a cell permission, wherein the property value is recognized by the computer for implementing the conditional rules.

6. A computer program product for conditional permission control in a digital data sheet based on permission formulas, the computer program product comprising a non-transitory computer readable storage medium having program code embodied therewith, the program code executable to:
    check, by a computer, permission formulas of data cells in the data sheet, in response to a user opening the data sheet, the permission formulas being input by an administrator of the datasheet, the permission formulas including conditional rules which define permissions of respective users to respective ones of the data cells;
    set, by the computer, cell permissions for the data cells, based on the permission formulas, wherein cell permissions of one or more other data cells in the data sheet are set by performing the following operations to each permission formula, which is from the permission formulas, of a data cell from the data cells: copying, pasting, dragging and auto-filling;

recheck, by the computer, the cell permissions, in response to the user editing one or more of the data cells; and reset, by the computer, the cell permissions at runtime, based on the permission formulas, in response to a respective one of the conditional rules being changed by the user editing the one or more data cells.

7. The computer program product of claim 6, further comprising the program code executable to:

receive, by the computer, a selection of a data cell from the data cells in the data sheet, from the administrator of the data sheet; and receive, by the computer, an input of one permission formula from the permission formulas for the data cell, from the administrator.

8. The computer program product of claim 6, further comprising the program code executable to:

display, by the computer, the permission formulas in the data cells, in response to the administrator of the data sheet choosing to show the permission formulas in the data cells.

9. The computer program product of claim 6, wherein each permission formula of a data cell which is from the permission formulas, comprises one or more of a formula name, mathematical variables, and logical variables, wherein each permission formula of a data cell refers to the one or more other data cells.

10. The computer program product of claim 6, wherein each permission formula of a data cell which is from the permission formulas, is calculated by the computer and results in a data cell from the data cells having a property value of a cell permission, wherein the property value is recognized by the computer for implementing the conditional rules.

11. A computer system for conditional permission control in a digital data sheet based on permission formulas, the computer system comprising:

one or more processors, one or more computer readable tangible storage devices, and program instructions stored on at least one of the one or more computer readable tangible storage devices for execution by at least one of the one or more processors, the program instructions executable to:

check, by a computer, permission formulas of data cells in the data sheet, in response to a user opening the data sheet, the permission formulas being input by an administrator of the datasheet, the permission formulas including conditional rules which define permissions of respective users to respective ones of the data cells;

set, by the computer, cell permissions for the data cells, based on the permission formulas, wherein cell permissions of one or more other data cells in the data sheet are set by performing the following operations to each permission formula, which is from the permission formulas, of a data cell from the data cells: copying, pasting, dragging and auto-filling;

recheck, by the computer, the cell permissions, in response to the user editing one or more of the data cells; and reset, by the computer, the cell permissions at runtime, based on the permission formulas, in response to a respective one of the conditional rules being changed by the user editing the one or more data cells.

12. The computer system of claim 11, further comprising the program instructions executable to:

receive, by the computer, a selection of a data cell from the data cells in the data sheet, from the administrator of the data sheet; and receive, by the computer, an input of one permission formula from the permission formulas for the data cell, from the administrator.

13. The computer system of claim 11, further comprising the program instructions executable to:

display, by the computer, the permission formulas in the data cells, in response to the administrator of the data sheet choosing to show the permission formulas in the data cells.

14. The computer system of claim 11, wherein each permission formula of a data cell, which is from the permission formulas, comprises one or more of a formula name, mathematical variables, and logical variables, wherein each permission formula of a data cell refers to the one or more other data cells.

15. The computer system of claim 11, wherein each permission formula of a data cell which is from the permission formulas, is calculated by the computer and results in a data cell from the data cells having a property value of a cell permission, wherein the property value is recognized by the computer for implementing the conditional rules.

* * * * *